(12) United States Patent
Bostick et al.

(10) Patent No.: US 8,122,115 B2
(45) Date of Patent: Feb. 21, 2012

(54) COMMUNICATION PROFILES FOR INTEGRATED DATABASE MESSAGING SYSTEM

(75) Inventors: James E. Bostick, Cedar Park, TX (US); Randolph M. Forienza, Austin, TX (US); John P. Kaemmerer, Pflugerville, TX (US); Raghuraman Kalyanaraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 12/125,148

(22) Filed: May 22, 2008

(65) Prior Publication Data
US 2008/0222085 A1 Sep. 11, 2008

Related U.S. Application Data

(63) Continuation of application No. 11/337,256, filed on Jan. 20, 2006, now abandoned.

(51) Int. Cl.
G06F 15/173 (2006.01)
(52) U.S. Cl. ......... 709/223; 709/224; 709/217; 709/245
(58) Field of Classification Search .................. 709/203, 709/217–219, 223–224, 245
See application file for complete search history.

(56) References Cited

U.S. PATENT DOCUMENTS

| | | | |
|---|---|---|---|
| 5,761,696 A | 6/1998 | Giordano et al. | |
| 5,890,148 A | 3/1999 | Bhargava et al. | |
| 6,058,389 A | 5/2000 | Chandra et al. | |
| 6,182,075 B1 | 1/2001 | Hsu | |
| 6,789,112 B1 | 9/2004 | Freeman et al. | |
| 6,868,544 B2 | 3/2005 | Dalal et al. | |
| 6,920,475 B1 | 7/2005 | Klots et al. | |
| 2002/0049903 A1* | 4/2002 | Ussery et al. | 713/165 |
| 2002/0111986 A1 | 8/2002 | Wolfson | |
| 2003/0220945 A1* | 11/2003 | Malik et al. | 707/203 |
| 2003/0221023 A1* | 11/2003 | Peddada et al. | 719/330 |
| 2004/0078446 A1 | 4/2004 | Daniell et al. | |
| 2004/0122801 A1* | 6/2004 | Schirmer et al. | 707/3 |

(Continued)

FOREIGN PATENT DOCUMENTS
CN 1283015 A 2/2001

OTHER PUBLICATIONS

Certificate of Translation, p. 1.

(Continued)

*Primary Examiner* — Philip B Tran
(74) *Attorney, Agent, or Firm* — Schmeiser, Olsen & Watts; Mark Vallone (57) ABSTRACT

Systems, methods and media for providing communication profiles for an integrated database messaging system are disclosed. Embodiments of the method may include receiving from a user of the database messaging system a request for one or more profiles and determining one or more profiles associated based on the attributes of each profile request by accessing a profile database. The one or more profiles may include an indication of a user of the database messaging system and an Internet Protocol (IP) address. Embodiments may also include providing the one or more determined profiles to the requesting user. Further embodiments may include receiving an indication of one or more changes to the profile database and modifying the profile database. The user may include a database administrator (DBA) or user of a database. Each profile may contain personal, organizational, contact, group or other types of information.

16 Claims, 7 Drawing Sheets

U.S. PATENT DOCUMENTS

| | | | |
|---|---|---|---|
| 2004/0243851 | A1 | 12/2004 | Lee et al. |
| 2005/0198150 | A1 | 9/2005 | Werner |
| 2006/0053194 | A1 | 3/2006 | Schneider et al. |
| 2006/0224404 | A1* | 10/2006 | Keusseyan .................... 705/1 |
| 2007/0174395 | A1 | 7/2007 | Bostick et al. |
| 2007/0174417 | A1 | 7/2007 | Bostick et al. |
| 2007/0239755 | A1 | 10/2007 | Mahoney |
| 2008/0215693 | A1 | 9/2008 | Bostick |
| 2008/0222264 | A1 | 9/2008 | Bostick |

OTHER PUBLICATIONS

English Translation of the "Notice of Opinion of First Examination" from the China's Patent Office, dated Jun. 5, 2009, pp. 11.

"Notice of Opinion of First Examination" from the China's Patent Office, dated Jun. 5, 2009, in Chinese, pp. 8.

N. Jensen, Non-Final Office Action: mail date Feb. 4, 2009; published by the USPTO in utility U.S. Appl. No. 11/337,262, pp. 14.

N. Jensen, Non-Final Office Action: mail date Jul. 8, 2009; published by the USPTO in utility U.S. Appl. No. 12/061,589, pp. 24.

N. Jensen, Non-Final Office Action; mail date Jan. 23, 2009; published by the USPTO in utility U.S. Appl. No. 11/337,256, pp. 20.

N. Jensen, Final Office Action: mail date Jul. 7, 2009; published by the USPTO in utility U.S. Appl. No. 11/337,256, pp. 18.

N. Jensen, Non-Final Office Action: mail date Feb. 4, 2009; published by the USPTO in utility U.S. Appl. No. 11/337,261; pp. 20.

N. Jensen, Non-Final Office Action: mail date Jul. 9, 2009; published by the USPTO in utility U.S. Appl. No. 12/125,204; pp. 23.

Certificate of Translation.

English translation of the "Notice of Opinion of First Examination" from the China's Patent Office, dated Jun. 5, 2009.

"Notice of Opinion of First Examination" from the China's Patent Office, dated Jun. 5, 2009, in Chinese.

N. Jensen, Final Office Action; mail date Dec. 23, 2009, published by the USPTO in utility U.S. Appl. No. 12/125,204, pp. 29.

N. Jensen, Final Office Action; mail date Jan. 5, 2010, published by the USPTO in utility U.S. Appl. No. 12/061,589, pp. 28.

James E. Bostick, et al. as Applicants, Amendment Accompanying RCE, mail date Mar. 23, 2010, published by Applicants in utility U.S. Appl. No. 12/125,204, pp. 12.

James E. Bostick, et al. as Applicants, Amendment Accompanying RCE, mail date Apr. 2, 2010, published by Applicants in utility U.S. Appl. No. 12/061,589, pp. 12.

* cited by examiner

COMMUNICATION PROFILES FOR INTEGRATED DATABASE MESSAGING SYSTEM

CROSS-REFERENCES TO RELATED APPLICATIONS

Pursuant to 35 USC §120, this continuation application claims priority to and benefit of U.S. patent application Ser. No. 11/337,256, entitled "COMMUNICATION PROFILES FOR INTEGRATED DATABASE MESSAGING SYSTEM", filed on Jan. 20, 2006 now abandoned, the disclosure of which is incorporated herein in its entirety for all purposes. This application is also related to U.S. patent application Ser. No. 12/061,589, entitled "SYSTEMS, METHODS, AND MEDIA FOR COMMUNICATION WITH DATABASE CLIENT USERS", filed on Apr. 2, 2008 and U.S. patent application Ser. No. 12/125,204, entitled "INTEGRATED TWO-WAY COMMUNICATIONS BETWEEN DATABASE CLIENT USERS AND ADMINISTRATORS", filed on May 22, 2008, each of which is copending and assigned to the assignee hereof.

FIELD OF INVENTION

The present invention is in the field of data processing systems and, in particular, to systems, methods and media for providing communication profiles for an integrated database messaging system for communications between database client users and database administrators.

BACKGROUND

Computer systems such as personal computers (PCs), servers, workstations, and mainframes are well known in the art. Computer systems have attained widespread use for providing computing power to many segments of today's modern society. One important, function for computer systems is to access, modify, and share information. To accomplish this, information is often stored in a database so that it may be shared among many computer systems. Databases typically have a database manager to facilitate access, manipulation, or storage of the information in the database by other computer systems. The database manager may typically execute on a database server while computer systems using the database may serve as database clients in a client-server relationship. Example database managers include International Business Machine Corporation's (IBM®'s) DB2® database management system, Microsoft Corporation's Microsoft® SQL Server system, Oracle Corporation's Oracle® database management system, or Sybase, Inc.'s® database management system. Database servers and their clients may run on various operating system platforms and database clients (and their applications) communicate with the database server in order to obtain data from the server.

A database administrator (DBA) may be responsible for managing the environmental aspects of a database such as recoverability, resource management, integrity, security, availability, performance, and development and testing support. Database server support commonly offers the ability for the database server to notify the DBA of events (such as table locks) for which the DBA has requested notification as well as sending return codes (such as error, warning or informational codes) to a connected application. Often, a DBA wishes to inform database client users of particular events, such as when the database needs to be taken down or recycled for maintenance, when the database has performance problems, or other occurrences. By informing database client users of the problem (as well as estimated timelines for completion or workarounds), the DBA may provide better service to database clients and reduce the frustration some database client users feel when the database becomes unavailable for reasons unknown to them.

One solution to this problem is to use instant messaging (IM) systems to send messages from the DBA to database client users. This solution, however, suffers from a significant problem in that the DBA must know the IM identity of the database client user who is connected to the database in order to send them ah IM message. In a typical large database, the DBA will not know which particular database client users are connected at any given time and therefore cannot effectively send them IM messages. Moreover, DBAs and database client users often change (such as for different shifts) and are often remote, increasing the difficulty of knowing which database client users are presently using the database. Such a solution may also rely on the availability of an IM server to forward the message, as well as both sender and receiving being logged on, further limiting the usefulness of IM.

Another problem is that database client users do not have an effective and efficient mechanism to communicate with a DBA. As database client users often do not know the identity of DBAs, they cannot easily contact the DBAs via phone, e-mail, or IM message. Even if a database client user knows the identity of a DBA, they may not know whether the DBA is on-shift or working from an alternative location, making it more difficult to communicate with the DBA. There is, therefore, a need for an efficient and effective mechanism for providing communication between database client users and administrators.

SUMMARY OF THE INVENTION

The problems identified above are in large part addressed by systems, methods and media for providing communication profiles for an integrated database messaging system. Embodiments may include a method for providing communication profiles for an integrated database messaging system. Embodiments of the method may include receiving from a user of the database messaging system a request for one or more profiles and determining one or more profiles associated based on the attributes of each profile request by accessing a profile database. The one or more profiles may include ah indication of a user of the database messaging system and an Internet Protocol (IP) address. Embodiments may also include providing the one or more determined profiles to the requesting user. Further embodiments may include receiving an indication of one or more changes to the profile database and modifying the profile database. The user may include a database administrator (DBA) or database client user. Each profile may contain personal, organizational, contact, group or other types of information. In a further embodiment, the profile request includes an indication of a group of users and the method may further include receiving a message request and transmitting a message to the IP addresses associated with the profiles of the group of users.

Another embodiment provides a machine-accessible medium containing instructions effective, when executing in a data processing system, to cause the system to perform a series of operations for communicating between database client users and administrators. The series of operations generally includes receiving from a user of the database messaging system a request for one or more profiles and determining one or more profiles associated based on the attributes of each profile request by accessing a profile database. The one or more profiles may include an indication of a user of the database messaging system and an Internet Protocol (IP) address. Embodiments may also include a series of operations for providing the one or more determined profiles to the requesting user. Further embodiments may include a series of operations for receiving an indication of one or more changes to the profile database and modifying the profile database.

A further embodiment provides a database messaging system. The database messaging system may generally include a database server having a database messaging module to transmit a message to a determined IP address, where the determined IP address is associated with a database client. The database messaging system may also include one or more database clients in communication with the database server and each having a client listener, where each client listener may receive a message from the database server and display the received message. The database messaging system may also include a profile database and a communication profile module to receive a request from a user of the database messaging system for a profile associated with, for example, combinations of an IP address, a database name, and/or a group name, or other pertinent attributes. The communications profile module may also determine one of more profiles based on the profile request by accessing, the profile database. The communications profile module and profile database may be located on the database client and/or the database server.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives, falling within the spirit and scope of the present invention as defined by the appended claims. The descriptions below are designed to make such embodiments obvious to a person of ordinary skill in the art.

The system and methodology of the disclosed embodiments provides for an effective and efficient way of providing communication between a DBA and database client users. The disclosed database messaging system provides a mechanism for a DBA to send a message to database client users without knowing their identity by facilitating transmittal of the message to the IP address of the user's database client and displaying the message to the user at the database client. Similarly, the disclosed system provides a mechanism for database client users to transmit a message to the DBA at the IP address of the database server without knowing the identity of the DBA. While such a system provides an effective means for communication between DBAs and database client users, it is often desired to know more information about the database client user and/or DBA than just the IP address. The disclosed system and methodology for providing communication profiles advantageously provides personal information, organizational information, contact information, group information or other types of information to DBAs and database client users. For situations where transmission of a message to a generic IP address is unsatisfactory, the disclosed system may accordingly provide a more robust and useful solution. A database client user or DBA may, in one example, use contact information in a profile to e-mail or call someone who is not responding to messages displayed at their IP address. In another example, a DBA may search for profiles associated with a group of database, client users who use the same application and, upon accessing the profiles, may send a message to the IP address of each database client associated with those database client users. The DBA of this example may effectively broadcast messages to these users utilizing profile selection and groups of profiles. The use of profiles may also support the creation and gathering of metrics and statistics for the database messaging 100. The profiles may be scanned to extract relevant information and attributes to generate reports or perform other tasks.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Figure 1:
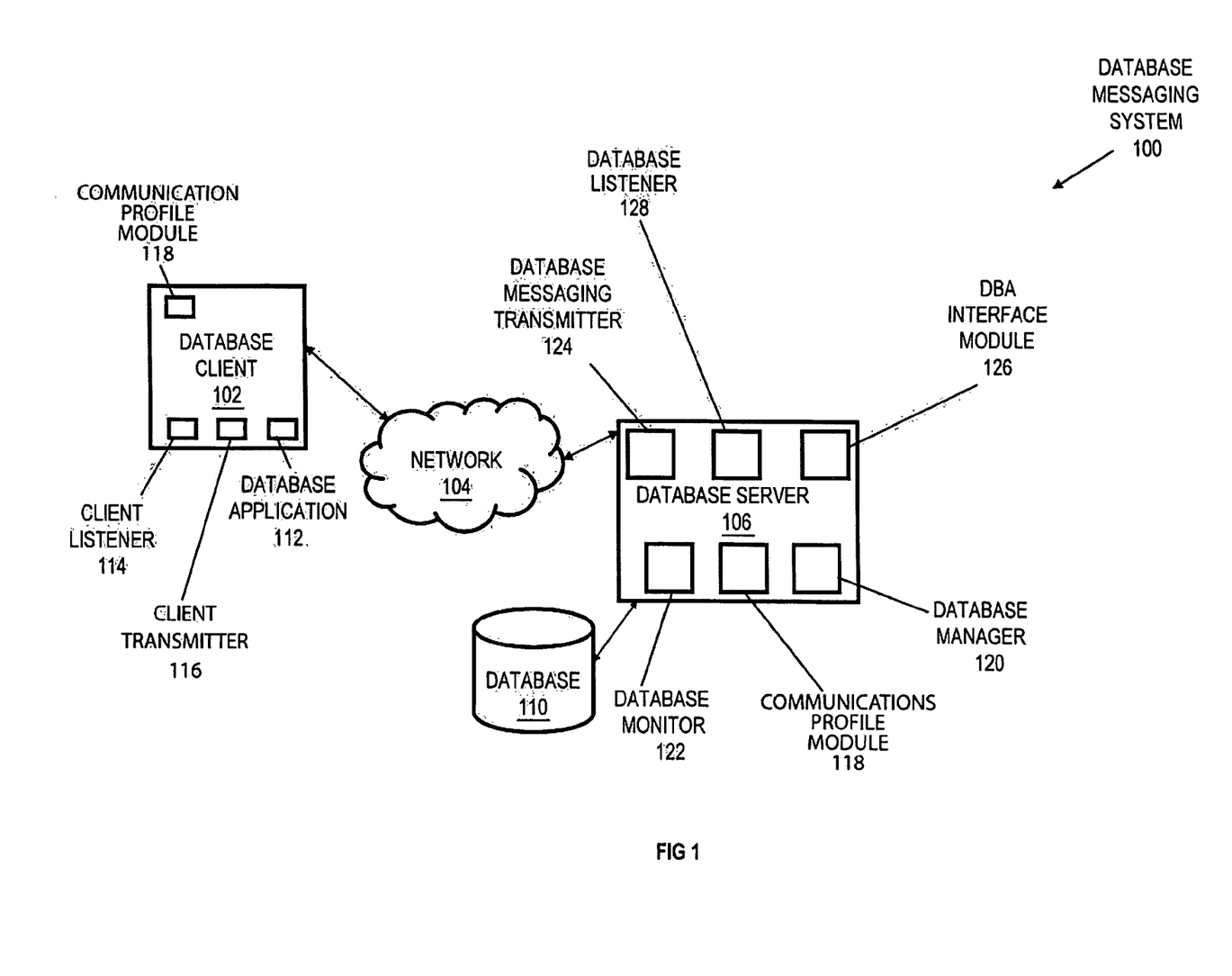
FIG. 1 depicts an environment for a database messaging system with a database server and one or more database clients according to one embodiment.

Turning now to the drawings, FIG. 1 depicts an environment for a database messaging system with a database server and one or more database clients according to one embodiment. The database messaging system 100 may include one or more database clients 102 in communication with a database server 106 via a network 104 as well as a database 110 in communication with the database server 106. Each database client 102 may include a database application 112 to access the database 110 through the database server 106. Database client 102 may facilitate communications between database client users and the database server 106. The database server 106 may manage communications to and operations with database 110 and may also, as described in more detail subsequently, facilitate communications from a DBA to users of the database clients 102 and from database client users to the DBA. As will be described in more detail subsequently, either or both of the database client 102 and the database server 106 may include a communication profile module 118 to provide profiles for users of the database messaging system 100. The profiles may include information about users that allows other users to find out more information about the users, contact those users via other means, or perform other tasks. Users of the database messaging system 100 may include both database client users and DBAs as well as other users.

In the database messaging system 100, any of the database clients 102, the database server 106, and the database 110 may be located at the same location, such as in the same building or computer lab, or could be remote. While the term "remote" is used with reference to the distance between the components of the database messaging system 100, the term is used in the sense of indicating separation of some sort, rather than in the sense of indicating a large physical distance between the systems. For example, any of the components of the database messaging system 100 may be physically adjacent or located as part of the same computer system in some network arrangements.

Each database client 102 may include one or more personal computers, workstations, servers, mainframe computers, notebook or laptop computers, desktop computers, PDAs, set-top boxes, mobile phones, wireless devices, or the like. In some embodiments, a database client 102 may be a computer system as described in relation to FIG. 2. The database client 102 may be in wired or wireless communication with network 104. A database client user may utilize a database client 102 and its database application 112 to facilitate the access, viewing, and use of content on database 110 through the use of database server 106. Application 112 may include any type of executable application that accesses database 110, such as an application that uses files from database 110, a word processor, a spreadsheet, business applications (e.g., industry-specific software), a browser, of any other type of application.

Figure 4:
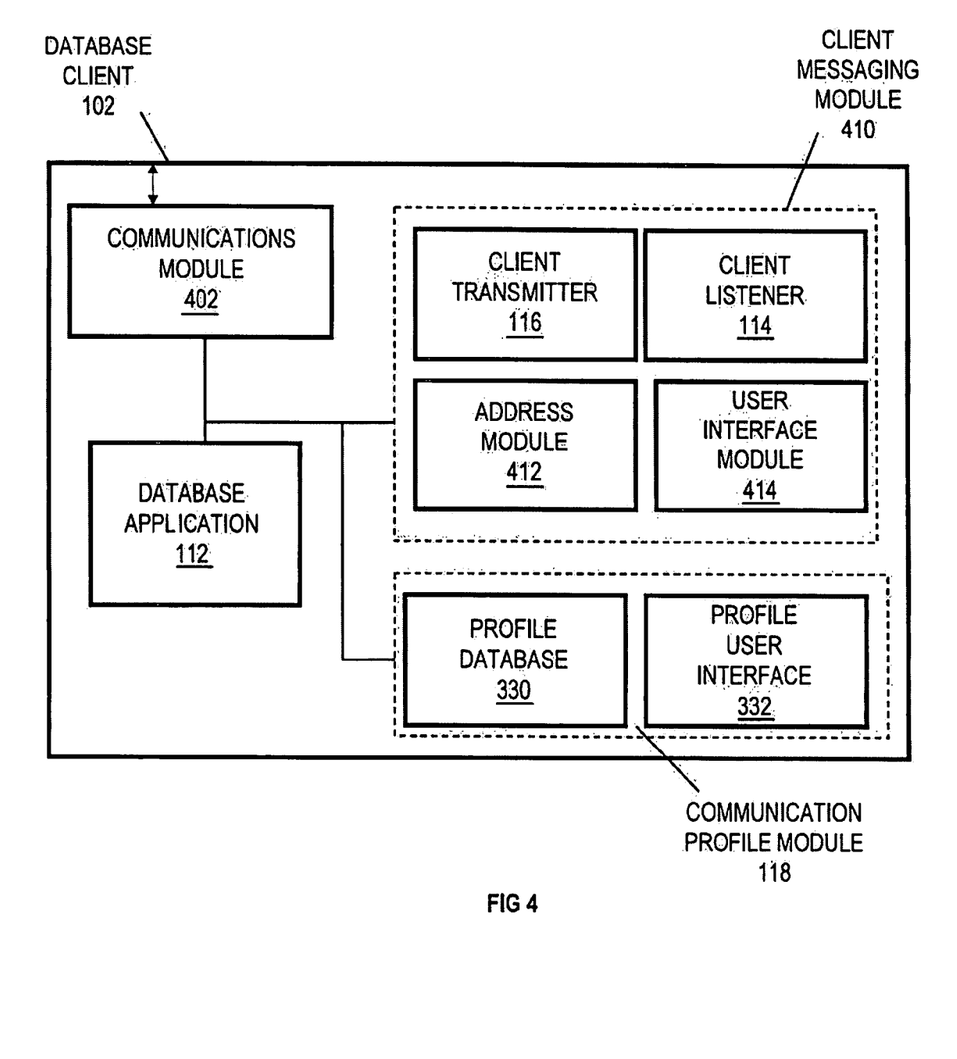
FIG. 4 depicts a conceptual illustration of software components of a database client with a client messaging module and a communication profile module according to one embodiment.

Each database client 102 may include a client listener 114 and a client transmitter 116 as part of a client messaging module, as described in more detail in relation to FIG. 4. The client listener 114 may receive messages from the DBA through the database server 106, generate a display window (such as a new window or pop-up window) or utilize an existing window, and display the message to a database client user. As will be described in more detail subsequently, the client listener 114 may monitor a predetermined port and act as a server on the database client 102 machine. The client listener 114 may optionally be incorporated into the database application 112 or any database management software installed on the database client 102. The client transmitter 116 may receive a request to transmit a message to a DBA from a database client user, determine the IP address of the database server 106, and transmit the message to the database server 106, which in turn provides the message to the DBA. The client transmitter 116 may thus act as a client on the database client 102 with respect to the database server 106.

A database client 102 may also include a communication profile module 118. As will be described subsequently, the database server 106 may also have a communication profile module 118 that either works independently of or in conjunction with that of the database client 102. A communication profile module 118 may have a profile database for storing profiles and/or may be in communication with other communication profile modules 118 on other systems and their profile databases. A communication profile module 118 of a database client 102 may, for example, access a local profile database of a profile database located at the database server 106 to find a profile for a DBA based on an IP address and/or database name. Upon request of a database client user, the communication profile module 118 may determine any profiles associated with an IP address and provide the profile to the database client user, such as by displaying it to the database client user using a GUI or other interface. A database client user with proper authorization may also add of edit their profiles or those of others, allowing for efficient updating of profiles in the database. In some embodiments, only a DBA will have access to modify database profiles. In other embodiments, a database client user may have the ability to modify part of their profile while others parts are restricted (e.g., database client user can modify home phone number but not supervisor).

Profiles may include any type of information, including personal information, organizational information, or contact information, associated with a user such as a database client user or DBA. Personal information may include any information associated with the database client user, such as their name, address, shift hours, office location, authorizations, applications they have access to, etc., or similar information for a DBA. Organizational information may include any information associated with a user's place within an organization, such as the user's title, job responsibilities, supervisor's name or contact information, organizational/reporting structure, term of service, etc. Contact information may include any information associated with communication with a user, such as the user's phone number, alternative phone number, fax number, pager number, e-mail address, Internet address, MAC address, alternative contact information, an 'away' message, etc.

Profiles may also include group information, which may be an indication of one or more groups, or collections, to which the user belongs. These groups may, in some embodiments, may be based on other types of profile information, such as applications, organizational structures, etc. Groups may also be defined by a user of the database messaging system 100. A database client user may, for example, define a group of DBAs with whom they frequently work. A DBA may, in another example, define a group of database client users who use a particular application, who want to be notified of particular events, (e.g., updates, system interruptions, etc.), etc. When creating a profile, the same profile information may be copied into multiple groups, potentially saving time when new users are added or other situations.

Network 104 may be any type or combination of data communications channel(s), such as the Internet, an intranet, a local area network (LAN), a wide area network (WAN), an Ethernet network, a wireless network, a proprietary network, or a broadband cable network. In one exemplary embodiment, a corporate intranet implemented on a LAN may serve as network 104 for communications between components of a corporate database messaging system 100. Those skilled in the art will recognize, however, that the invention described herein may be implemented utilizing any type of data, communications channel or combinations of data communication channels.

The database server 106 provides an interface between database clients 102 and database 110 by facilitating access, manipulation, and storage of information in database 110 by database applications 112 of the database clients 102. The database server 106 may be one or more of any type of computer system, including servers, personal computers, workstations, mainframe computers, notebook or laptop computer, desktop computers, or the like. In some embodiments, the database server 106 may be a computer system as described in relation to FIG. 2. An example database server 106 is an IBM® eServer® server or similar server. In this example, the database server 106 may include software such as IBM®'s DB2® database management system application that provides ah effective and robust database platform.

Figure 3:
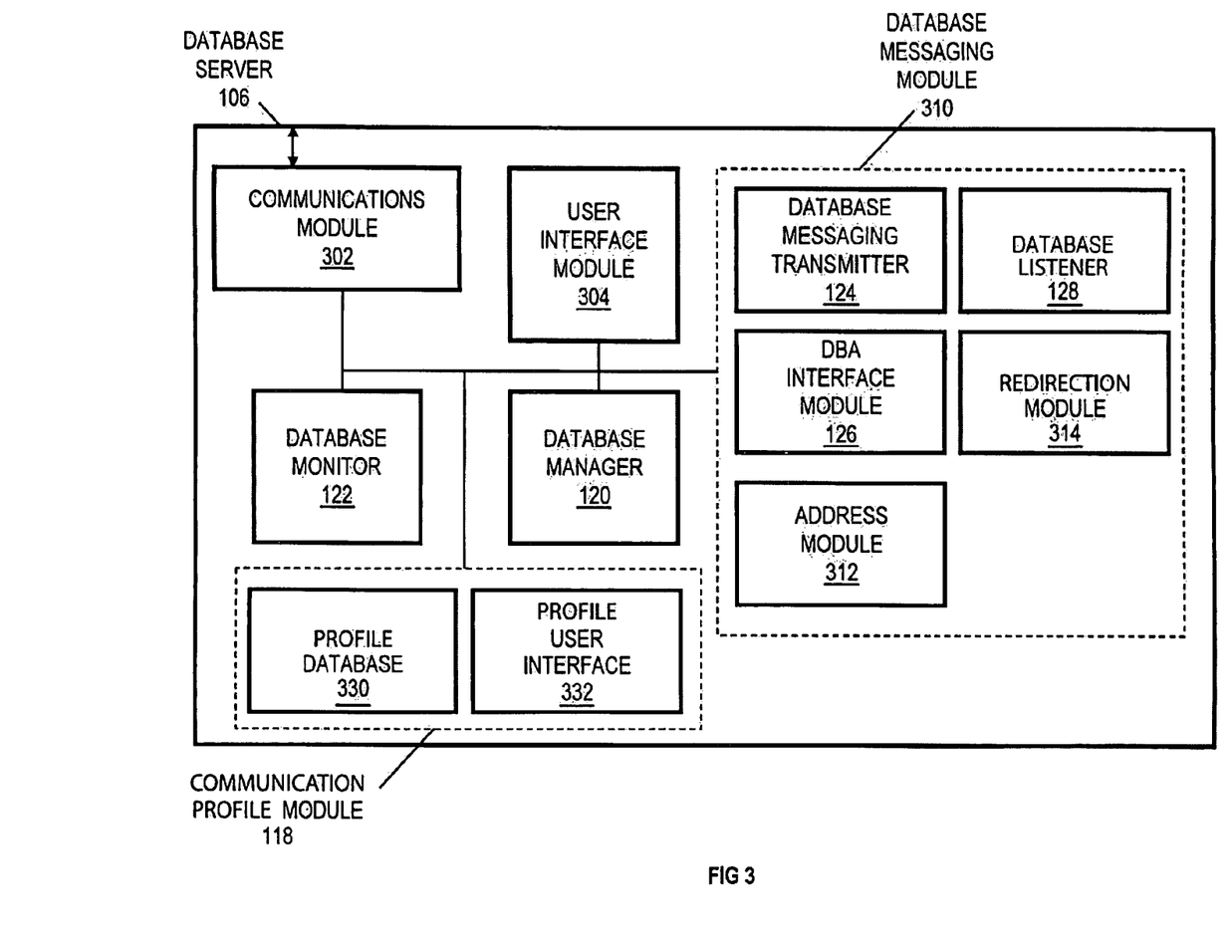
FIG. 3 depicts a conceptual illustration of software components of a database server with a database messaging module and a communication profile module according to one embodiment.

The database server 106 may include modules such as a communication profile module 118, a database manager 120, a database monitor 122, a database messaging transmitter 124, a DBA interface module 126, and a database listener 128. The database manager 120 may be a database management system such as, IBM®'s DB2® database management system, Microsoft®'s SQL Server system, Oracle®'s database management system, or Sybase, Inc.'s® database management system. The database manager 120 may facilitate access, manipulation, or storage of information in database 110 by database applications 112 of the database clients 102. The database monitor 122 may monitor database 110 activities and may also allow database server support to communicate with the DBA. The database monitor 122 may monitor any type of database 110 activity, such as when records are inserted, updated, or deleted, deadlock of the database 110, exceeding a predefined threshold for file system size. The database monitor 122 may log these activities and/or notify the DBA upon their occurrence.

The database messaging transmitter 124 and DBA interface module 126 (which may both be part of a database messaging module as described in relation to FIG. 3) may provide for communications between the DBA to users of the database clients 102. The DBA interface module 126 may receive a message request from a DBA or other person to be sent to one or more database client users via their database clients 102. In some embodiments, the DBA interface module 126 provides a graphical user interface (GUI) with which the DBA may input information. The message request may include both message content (including message text, files for attachment, or other information) and an indication of the database client user or users to whom the message should be sent. A DBA or other authorized person may be using a separate DBA computer system, may be directly accessing database server 106, or using another computer system. After receiving the message request, the database messaging transmitter 124 may then transmit a message to the network address (i.e., IP address) for each database client 102. The database messaging transmitter 124 may effectively serve as a client to the client listener 114 of the receiving database clients 102. Database servers 106 generally have access to the IP or other network address for all connected database clients 102 and may advantageously use this IP address to communicate with database client users.

The database listener 128 may facilitate communications from users of the database clients 102 to the DBA. The database listener 128 (acting as a server with respect to the client transmitter 116) may receive a message transmitted to an IP address of the database server 106 and intended for a DBA, such as by monitoring one or more ports of the database server 106. The database listener 128 may then provide the message to the DBA.

The database 110 may be a collection of related information accessed and managed by a database management system such as database manager 120. Database 110 may be any type of database, such as a hierarchical database or a relational database. Most modern databases are relational databases whose management systems restrict data access to a messaging protocol such as SQL, a nonprocedural language that allows a programmer to specify desired results. Example databases 110 may be consistent with management systems such as IBM®'s DB2® database management system, Microsoft®'s SQL Server system, Oracle®'s database management system or Sybase, Inc.'s® database management system. The data of database 110 may be stored on one or more storage media such as hard drives, on a storage area network (SAN), tape backup, network attached storage (NAS), or in any other fashion or combination of fashions. An example hardware solution to store a database 110 may be IBM®'s TotalStorage® line of disk storage systems.

The database server 106 may also have a communications profile module 118 in addition to, or instead of, that of the database client 102. The communication profile module 118 of the database server 106 may, in some embodiments, be substantially similar in function to that of the database client 102 and the description will not be repeated in the interest of brevity. A DBA may use the communication profile module 118 to find but information about database client users, such as when they need to contact one via phone after they failed to respond to messages to their IP address. A DBA with proper authorization may also add or edit their profiles or those of others, allowing for efficient updating of profiles in the database. In some embodiments, a DBA may only have authorization over a sub-group of database client users or databases.

Using the disclosed system, a DBA may send messages to individual or groups of database client users and database client users may likewise communicate with the DBA, providing for an effective and efficient mode of communication between database client users and DBAs. By using communication profile modules 118, both DBAs and database client users may advantageously access profiles for other users of the database messaging system 100 instead of relying solely on the IP address for that user's computer system. A DBA, for example, that is trying to reach a database client user but is not getting a response may access the database client user's profile to find that user's contact information so that they may call, e-mail, etc. If a database client 102 environment is repeatedly violating an operating standard, in another example, the DBA may be able to determine who is responsible for maintaining that client by accessing the profile. The DBA in this example may also be able to determine the organization and reporting structure to whom the responsible database client user reports. Conversely, a database client user may be unhappy with the performance of the database client 102 and may request service from the assigned DBA. If such service is unsatisfactory, the database client user may access the DBA profile to contact the DBA or, alternatively, to contact the DBA's supervisor for resolution. Users of the database messaging system 100 may also take advantages of groups of profiles to find others users of to broadcast messages to groups of users.

The communication profile module 118, like other components of the database messaging system 100, may be installed with the database or installed at a later time, such as part of an upgrade or a separate module. The communication profile modules 118 may be organized by node in some embodiments that includes both database clients 102 and a database server 106, so that one or more DBAs administering a database server 106 and each of the database client users administering a database client 102 may have the ability to add data that would personalize the node. The profile database in this embodiment may be located at either the database server 106, at one or more of the database clients 102, or distributed over multiple computer systems. In one embodiment, a central profile database may be located at the database server 106 and the communication profile modules 118 of the database clients 106 may access the central profile database either directly or through a communication profile module 118 of the database server 106.

Figure 2:
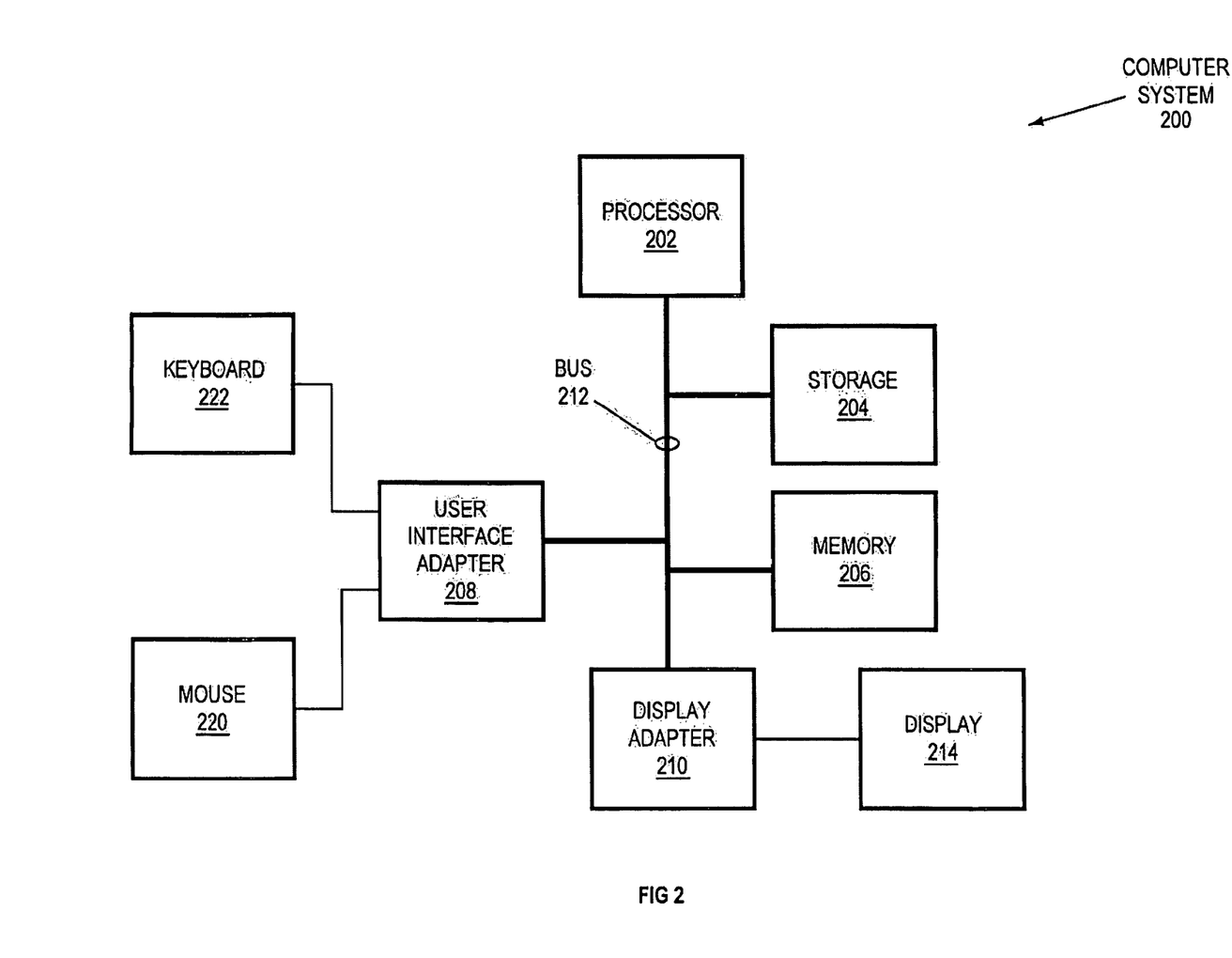
FIG. 2 depicts a block diagram of one embodiment of a computer system suitable for use as a component of the database messaging system.

FIG. 2 depicts a block diagram of one embodiment of a computer system 200 suitable for use as a component of the database messaging system 100, such as a database client 102 or a database server 106. Other possibilities for the computer system 200 are possible, including a computer having capabilities other than those ascribed herein and possibly beyond those capabilities, and they may, in other embodiments, be any combination of processing devices such as workstations, servers, mainframe computers, notebook of laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor, or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A database client user, for example, may input a desired message using the keyboard 222 of a database client 102. The bus 212 may also connect the processor 202 to a display 214, such as an LCD display or CRT monitor, via the display adapter 210. A database client 102 that receives a message from the database server 106, or a database server 106 that receives a message from a database client 102, may display that message in a window of display 214 in some embodiments. A database client 102 or database server 106 may also use display 214 to display a profile to a DBA or database client user, respectively.

FIG. 3 depicts a conceptual illustration of software components of a database server with a database messaging module and a communication profile module according to one embodiment. The database server 106 of the depicted embodiment includes a communication profile module 118, a database manager 120, a database monitor 122, a communications module 302, a user interface module 304, and a database messaging module 310. The database messaging module 310 may include sub-modules such as a database messaging transmitter 124, a DBA interface module 126, a database listener 128, an address module 312, and a redirection module 314. The communication profile module 118, database manager 120, database monitor 122, database messaging transmitter 124, DBA interface module 126, and database listener 128 are described in relation to FIG. 1 and the description will not be repeated for the sake of brevity.

The communication profile module 118 may include a profile database 330 and a profile user interface 332. The profile database 330 may store one or more profiles for users of the database messaging system 100. The stored profiles may optionally have an indication of one or more groups with which the profiles are associated. The profile user interface 332 may receive a request for a profile or group of profiles from a DBA, database client user, or other user. The profile user interface 332 may also display or otherwise provide a profile to a DBA, database client user or other user via GUI interface, text interface, or other means. In some embodiments, the profile user interface 332 may work with the DBA interface module 126 to interface with a DBA. In these embodiments a DBA who sends a message to ah IP address may, for example, also be presented with an option to see profiles associated with that IP address. In this fashion, a DBA may efficiently access profiles when transmission to an IP address is unsuccessful. Similarly, a DBA receiving a message from a database client user may alternatively also be presented with the profile for that database client user so that they know the origin of the message. The profile user interface 332 may also facilitate modifications to profiles in a profile database 330 by the DBA. A DBA may also request a group of profiles and send a message to the IP addresses associated with the profiles in the group in order to broadcast a message to each user in the profiles simultaneously.

The communications module 302 may facilitate communications to and from the database server 106, via network 104, such as communications with database clients 102. The user interface module 304 may receive user input from user input devices such as a mouse 220 or keyboard 222 and may also provide output to a user, such as via a display 214 or speaker.

The database messaging module 310 and its components may receive message requests from a DBA to be sent to one or more database clients 102, determine the IP addresses associated with the database clients 102, and transmit a message to those IP addresses. The database messaging module 310 and its components may also receive messages transmitted from database clients 102 and display or otherwise provide those messages to DBAs. As described previously, the DBA interface module 126 may receive the message request that includes message content and an indication of one or more database clients 102 to which the message will be sent. The DBA interface module 126 may also provide a GUI or text display of a received message to the DBA.

When the database messaging module 310 is transmitting a message, the address module 312 may determine an IP address associated with each of the one or more database clients 102 to which a message will be sent, after which the database messaging transmitter 124 may transmit the message to the determined IP addresses. As described previously, database servers 106 generally have access to the IP of other network address for all connected database clients 102. The address module 312 may determine the IP addresses in a number of fashions. If a DBA submits a list of one or more IP addresses, the address module 312 may simply use those IP addresses (after optionally converting them to decimal format). If the DBA specifies a database name, the address module 312 may determine all of the IP addresses currently active with or associated with that database. If a particular database client 102 is connected more than once to the same database 110, duplicate IP addresses may be eliminated. By allowing the DBA to specify a database name, the DBA may effectively broadcast a message to all connected database clients 102 without having to specify each individually. If the DBA specifies a group name, the address module 312 may determine the IP addresses associated with that group, such as by referencing a table. The address module 312 may use any methodology to translate the indication of database clients 102 received from the DBA to a list of one or more IP addresses.

When the database messaging module 310 is receiving a message, the database listener 128 may receive such message from a database client 102 by monitoring one or more ports of the database server 106 or other methodology. The redirection module 314 may provide additional flexibility in providing the content of the message to a DBA. If a DBA is local (i.e., with the database server 106), the DBA interface module 126 may display the message to the DBA, as described previously. The redirection module 314 may transmit the message to another device that the DBA is using when a DBA is remote from the database server 106.

FIG. 4 depicts a conceptual illustration of software components of a database client with a client messaging module and a communication profile module according to one embodiment. The database client 102 of the depicted embodiment includes a database application 112, a communication profile module 118, a communications module 402, and a client messaging module 410. The client messaging module 410 may include sub-modules such as a client listener 114, a client transmitter 116, an address module 412, and a user interface module 414. The database application 112, client listener 114, and client transmitter 116 are described in relation to FIG. 1 and the description will not be repeated for the sake of brevity.

The communication profile module 118 may include a profile database 330 and a profile user interface 332, as described previously in relation to FIG. 3. The profile user interface 332 may receive a request for a profile or group of profiles from a database client user, such as a database client user requesting a profile for a DBA for the database application 112 they are using. The profile user interface 332 may display or otherwise provide a profile to database client user via GUI interface, text interface, or other means. In addition to finding profiles for DBAs, a database client user may optionally be able to modify their own profile in the profile database 330 using the profile user interface 332.

The communications module 402 may facilitate communications to and from the database client 102 via network 104, such as communications with database server 106. The client messaging module 410 and its components may receive message requests from a database client user to be sent to the DBA, determine the IP addresses associated with the database server 106, and transmit a message to that IP address. The client messaging module 410 and its components may also receive messages from a DBA through the database server 106 and may then display or otherwise provide the message to the user of the database client 102. The client listener 114 and client transmitter 116 may provide for receipt and transmission of messages, respectively, for the client messaging module 410.

The address module 412 of the client messaging module 410 may determine an IP address associated with the database server 106, after which the client transmitter 114 may transmit the message to the determined IP address. The address module 412 may determine the IP address in any fashion, such as requesting the IP address of the database server 106 from the database application 112, which may need such information to provide access to database 110. Database clients 102 generally have access to the IP or other network address for the database server 106 with which they are connected. The user interface module 414 may receive user input from user input devices such as a mouse 220 or keyboard 222 and may also provide output to a database client user, such as via a display 214 or speaker. When the client messaging module 410 receives a message, for example, the user interface module 414 may display the message using display 214. A user may utilize a GUI or text interface of the user interface module 414 to view a message, input a new message, reply to a message, or request transmission of a message.

Figure 5:
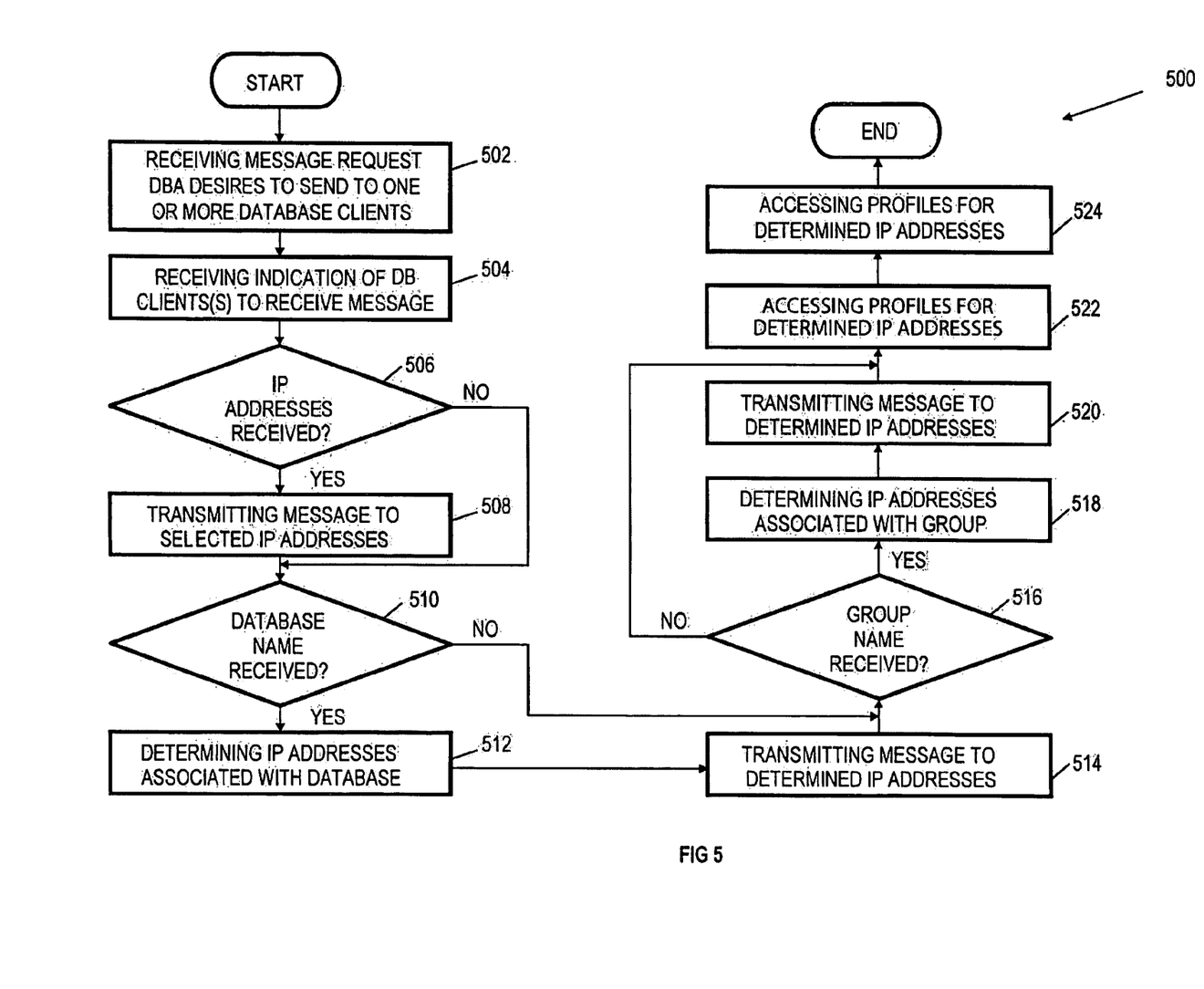
FIG. 5 depicts an example of a flow chart for receiving a message request and transmitting a message to one or more database clients according to one embodiment.

FIG. 5 depicts an example of a flow chart for receiving a message request and transmitting a message to one or more database clients according to one embodiment. In one embodiment, components of a database server 106 such as the database messaging module 310 and its components may perform the elements of flow chart 500. In the depicted embodiment, flow chart 500 begins with element 502, where the DBA interface module 126 of the database messaging module 310 may receive a message request from the DBA or other authorized person that includes message content that the DBA desires to send to one of more database clients 102 and/or database client users. As part of the receiving the message request, the DBA interface module 126 may also receive an indication of the one or more database clients 102 to receive the message at element 504. The indication of database clients 102 to receive the message may be a list of IP addresses for the database clients 102, a database name, a group name, or other indication or combination of indications. In some embodiments, the message request may include both the message content (e.g., message text, file attachments) and the indication of database clients 102.

After receiving the message request (with its indication of database clients 102), the address module 312 of the database messaging module 310 may determine the IP addresses associated with the database client 102 indications. At decision block 506, the address module 312 may determine whether one or more IP addresses were received as the database client 102 indications. If IP addresses were received, the address module 312 may determine the IP addresses for the messaging recipients by converting those IP addresses as necessary, such as by converting them to the decimal format. The database messaging transmitter 124 may then transmit the message (based on the message content) to the selected IP addresses at element 508. At decision block 510, the address module 312 may determine whether one or more database names were received as part of the database client 102 indication. If a database name was received, the method of flow chart 500 continues to element 512, where the address module 312 may determine the IP addresses associated with the database name, such as by cross-referencing the database name with a list of IP addresses currently accessing that database. The address module 312 may also eliminate duplicate IP addresses that may occur when a database client 102 is logged in multiple times. The database messaging transmitter 124 may then transmit the message to the determined DP addresses at element 514.

Similarly, at decision block 516, the address module 312 may determine whether one of more group names were received as part of the user indication. If a group name was received, the method of flow chart 500 continues to element 518, where the address module 312 may determine the IP addresses associated with the group name, such as by accessing the profiles associated with the group. The database messaging transmitter 124 may then transmit the message, to the IP addresses at element 520. Groups may, be similar in functionality to 'buddy lists' in instant messaging (IM) systems or contact lists in e-mail applications. By specifying a group name, a DBA may efficiently select all the database client users within that group without having to input each IP address individually. A DBA may, for example, create a group associated with a particular database application that includes the profiles of database client users (including their IP addresses) that use the database application. By selecting this group, the DBA may efficiently inform all interested clients about the application, such as when it has been updated, when support will no longer be provided, etc.

While the database messaging transmitter 124 is depicted as potentially transmitting a message separately at elements 508, 514, and 520, some or all of the transmission may be combined into one transmission before termination of method 500. Moreover, the received indication of one of more database clients 102 received as part of the message request may include a plurality of different methods for indicating database clients 102. For example, a message request may include a list of three IP address, a database name, and a group name. In this example, after all the relevant IP addresses are determined by the address module 312, the database messaging transmitter 124 may transmit the message to all IP addresses simultaneously if so desired.

At element 522, the database server 106 may optionally receive a message from a database client user (through a database client 102) and display or otherwise provide that message to a DBA. Element 522 may occur when, for example, database client users respond to a DBA-transmitted message or when a database client user sends a message to the DBA to report a problem or for other reasons. To display the message, the database listener 128 may generate a display window for the message, such as by creating such a display window or requesting another application to do so, or may utilize an existing window, such as a window created as part of an ongoing conversation between a DBA and database client user.

The database server 106 may also optionally receive a request for a profile, such as when a DBA requests the profile of a database client user sending him or her a message. Upon receiving a request for a profile, the communication profile module 118 may access the profiles for any of the determined IP addresses for the DBA at element 522, after which the method terminates.

Figure 6:
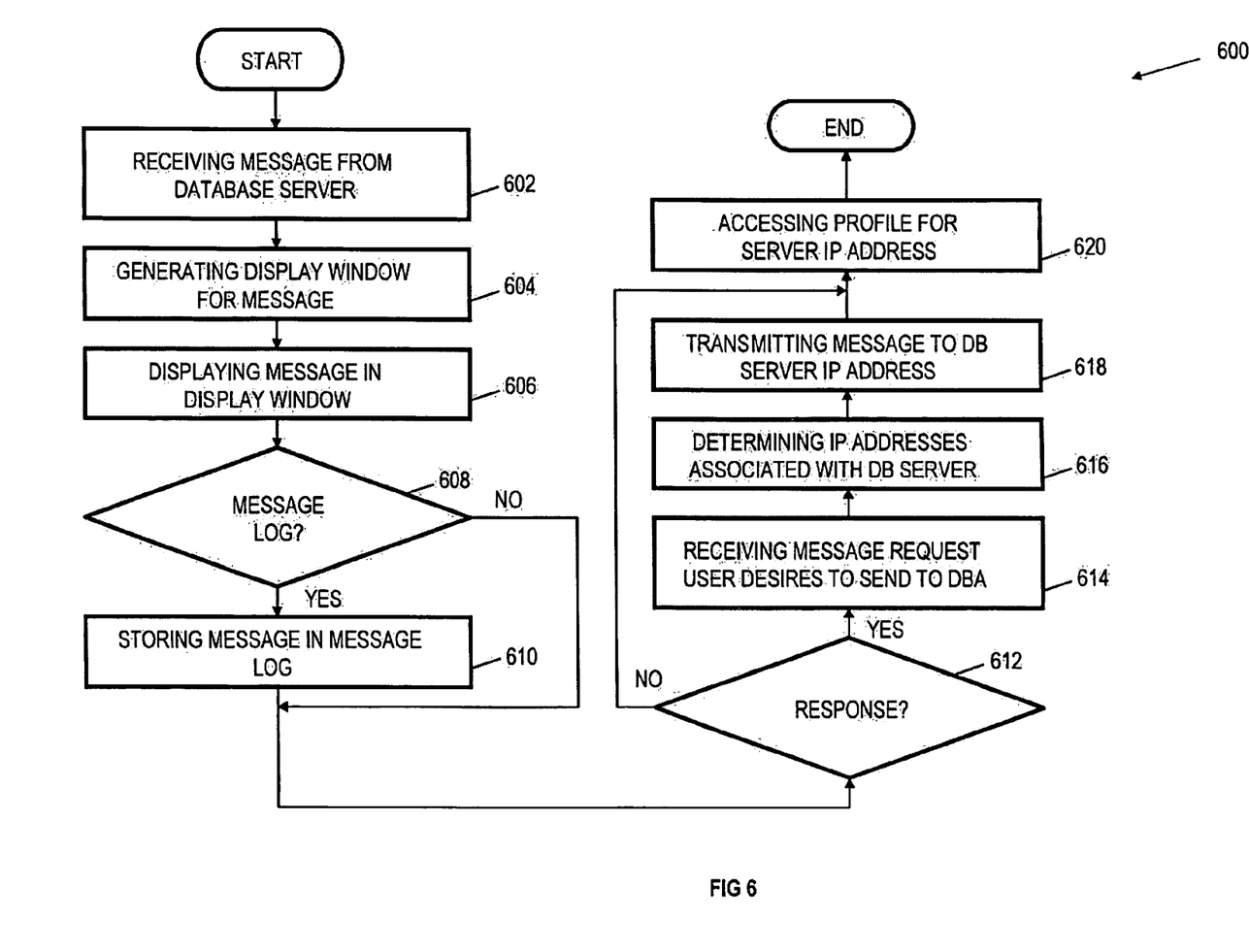
FIG. 6 depicts an example of a flow chart for receiving a message from a database server, displaying the message to a database client user, and transmitting a message to a DBA according to one embodiment.

FIG. 6 depicts an example of a flow chart for receiving a message from a database server, displaying the message to a database client user, and transmitting a message to a DBA according to one embodiment. In one embodiment, components of a database client 102 may perform the elements of flow chart 600. In the depicted embodiment, flow chart 600 begins with element 602, where the client listener 114 of a database client 102 may receive a message from the database server 106. The database client 102 executing the client listener 114 has an IP address matching one of the IP addresses determined by the address module 312 as described in relation to FIG. 5. As described previously, the client listener 114 may listen on a specified or pre-determined port of the database client 102 for the message. In doing so, the client listener 114 may act as the server on the database client 102 with respect to the database messaging transmitter 124.

After receiving the message, the client listener 114 may optionally generate a display window for the message at element 604, such as by creating such a display window or requesting another application to do so. A display window may be, for example, any aspect of a graphical user interface (GUI) that allows a message to be displayed such as a browser instantiation, a pop-up window, a text window, etc. Alternatively, the client listener 114 may utilize an existing window, such as in the case of repeated messages from a DBA or an ongoing conversation. The client listener 114 may then, at element 606, display the message in the generated display window, allowing a user of the database client 102 to view the message from the DBA. In some embodiments, the display window may preempt other, items on the database client user's display 214 so that they are more likely to see the message. The client listener 114 may also optionally determine whether to save the message in a message log at decision block 608. If the message will be saved, the client listener 114 may store the message in a message log at element 610.

In some embodiments, the database client user may desire to send a message to the DBA, such as to report a problem or to respond to a message received at element 602. If it is determined at decision block 612, that no message is to be sent, the method of flow chart 600 may terminate. If a message is to be sent, the method continues to element 614, where the user interface module 414 of the client messaging module 410 may receive a message request that the database client user desires to send to the DBA. The message request may include message content such as text, files, etc., as well as ah intention to send the message to a DBA. The address module 412 may determine the IP address associated with the database server 106 at element 616, such as by requesting such information from the application 112 or from detection when receiving a message. The client transmitter 116 may then, at element 618, transmit the message to the database server IP address for display or redirection to the DBA.

After transmitting a message to a DBA, a database client user may request profile information for the DBA if the DBA is non-responsive or for other reasons. Upon receiving a request for a profile, the communication profile module 118 may access the profiles for the server IP address at element 620, after which the method terminates. The methodology for accessing profiles is described in relation to FIG. 7.

Figure 7:
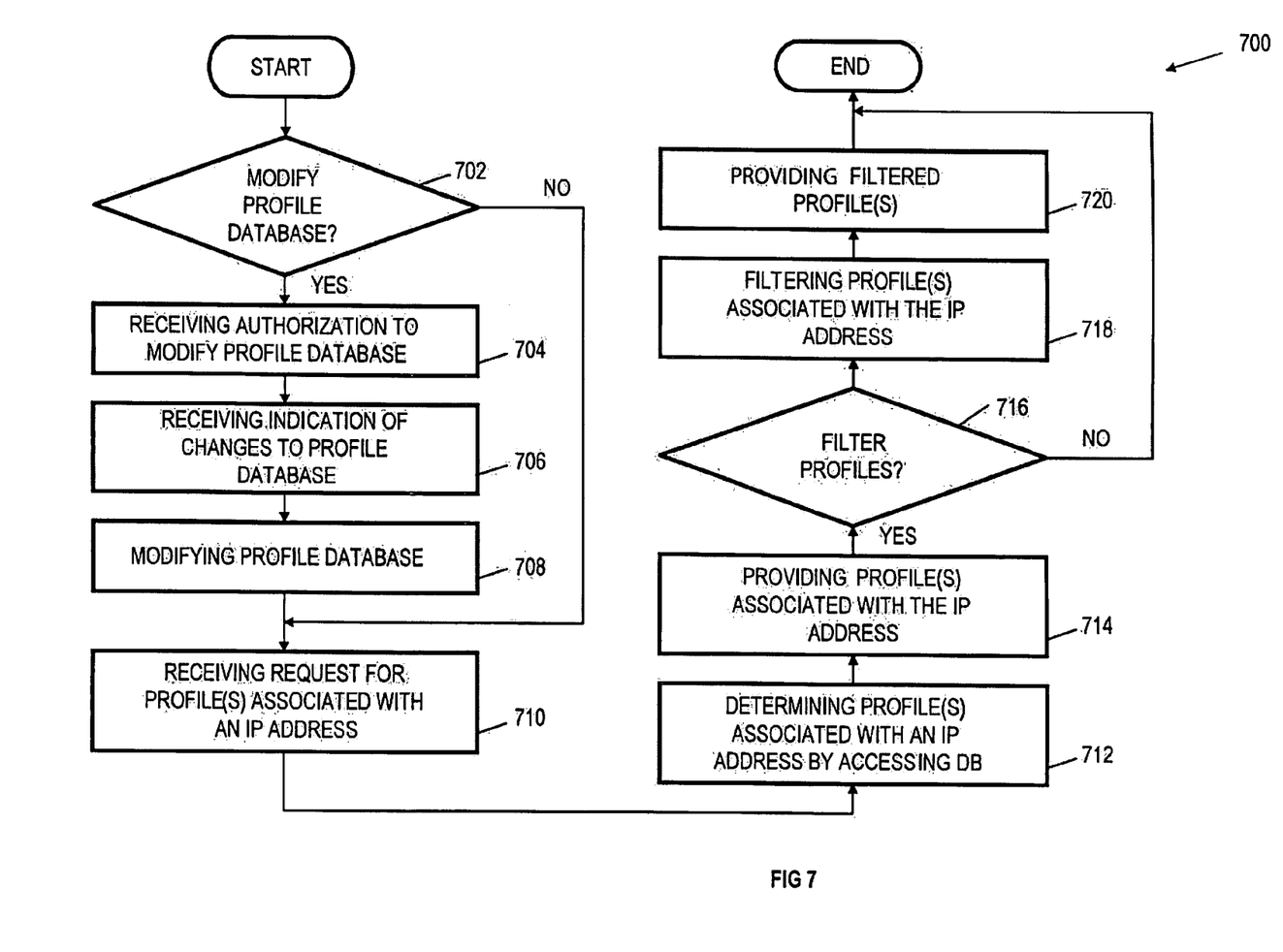
FIG. 7 depicts an example of a flow chart for receiving a request for a profile, determining a profile, and transmitting the profile according to one embodiment.

FIG. 7 depicts an example of a flow chart for receiving a request for a profile, determining a profile, and transmitting the profile according to one embodiment. In one embodiment, a communication profile module 118 and its components (located at either a database client 102 or database server 106) may perform the elements of flow chart 700. In the depicted embodiment, flow chart 700 begins with element 702, where the profile user interface 332 may receive a request to modify a profile database 330 from a user. A user of the communication profile module 118 may include a database client user, a DBA, or any other user. If no request to modify the profile database 330 is received (as will typically be the case), the method of flow chart 700 continues to element 710. If a request is received, the method of flow chart 700 continues to element 704, where the profile user interface 332 may optionally receive authorization from the user to modify the profile database 330. As described previously, authorization may be required to change some or all elements of a profile. Once authorization is received (if required), the profile user interface 332 may receive an indication of the changes at element 706 and may modify the profile database 330 at element 708.

At element 710, the profile user interface 332 may receive a request from a user for any profiles associated with ah IP address. A DBA, for example, may request a profile for a database client user or for all user profiles associated with a database, client 102 and IP address. A database client user, in another example, may request the profile of a DBA by requesting the profile associated with the database server 106 IP address, and/or database name. The communication profile module 118 may then, at element 712, determine the profile associated with the IP address by accessing the profile database 330. The communication profile module 118 may use any methodology for this task, including by access a table of the profile database 330 that provides a list of profiles associated with a particular IP address and/or database name. The communication profile module 118 may then transmit the profiles associated with an IP address to the user at element 714. Transmitting the profiles may include, for example, displaying the profiles to the user on a display 214, transmitting the profiles to another component (such as a DBA interface module 126 or user interface module 414) for display to the user, or other methodology.

The user interface for displaying profiles to a user may optionally provide for filtering. If the communication profile module 118 determines at decision block 716 that filtering will be used, it may filter the profiles associated with the IP address at element 718. After filtering the profiles, the communication profile module 118 may transmit the filtered profiles at element 720, after which the method terminates. Any type of filtering may be used. A DBA, for example, may wish to see the profiles associated with a particular application 112 and may accordingly request for profiles to be filtered by application 112. In another example, a DBA may desire to filter based on database client user organizational position so that they may see where each user falls in an organizational hierarchy.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for providing communication profiles for an integrated database messaging system. It is understood that the form of the invention shown and described in the detailed description and the drawings are to be taken merely as examples. It is intended that the following claims be interpreted broadly to embrace all the variations of the example embodiments disclosed.

What is claimed is:

1. A method for providing communication profiles in a database messaging system, the method comprising:
receiving, by a processor of a computer system from a first user of the database messaging system having at least one processing unit and display, a request for one or more profiles;
said processor determining one or more profiles based on the profile request by accessing a profile database, the one or more profiles each including an indication of a second user of the database messaging system and an Internet Protocol (IP) address of the second user, wherein the second user differs from the first user;
said processor filtering the one or more determined profiles; and
said processor providing the one or more filtered profiles to the first user,
wherein said providing the one or more filtered profiles to the first user comprises providing to the first user at least five different information items of the second user, and wherein each different information item of the at least five different information items of the second user is selected from the group consisting of a name of the second user, an address of the second user, shift hours of the second user, an office location of the second user, authorizations possessed by the second user, applications that the second user has access to, the second user's title in an organization, the second user's job responsibilities in the organization, a name of the second user's supervisor in the organization, the second user's place in an organizational/reporting structure of the organization, and a term of service of the second user in the organization.

2. The method of claim 1, wherein the organization comprises a plurality of client users, and wherein said filtering is based on organizational positions of the client users within an organizational hierarchy of the organization.

3. The method of claim 1, wherein said receiving the request from the first user is a result of the first user having sent the request in response to the second user not having responded to messages displayed at the IP address of the second user.

4. The method of claim 1, wherein the one or more determined profiles comprise group information pertaining to a plurality of groups to which the second user belongs, wherein said providing the one or more filtered profiles to the first user comprises providing the group information to the first user, wherein the plurality of groups include a first group comprising a plurality of users who use a specified application, and wherein the plurality of users comprises the second user.

5. The method of claim 1, wherein the database messaging system comprises a client computer and a server computer connected to each other by a network, wherein the one or more profiles are stored in both a client database at the client computer and a server database at the server computer, wherein the client computer comprises a client communication profile module configured to access the one or more profiles from the client database to provide the accessed one or more profiles to a client user at the client computer, wherein the server computer comprises a server communication profile module configured to access the one or more profiles from the server database to provide the accessed one or more profiles to a server user at the server computer, and wherein the first user is either the client user or the server user.

6. The method of claim 1, wherein the one or more determined profiles comprise contact information pertaining to the second user, wherein said providing the one or more filtered profiles to the first user comprises providing, to the first user, the contact information comprised by the one or more filtered profiles of the second user, and wherein the contact information of the second user comprises: the second user's regular phone number, the second user's alternative phone number, the second user's fax number, the second user's pager number, the second user's e-mail address, the second user's Internet address, the second user's MAC address, the second user's alternative contact information, and an AWAY message for the second user.

7. A computer program product, comprising a computer readable storage device having program instructions stored therein, said program instructions configured to be executed by a processor of a computer system to implement a method for providing communication profiles in a database messaging system, the method comprising:
receiving, by said processor from a first user of the database messaging system having at least one processing unit and display, a request for one or more profiles;
said processor determining one or more profiles based on the profile request by accessing a profile database, the one or more profiles each including an indication of a second user of the database messaging system and an Internet Protocol (IP) address of the second user, wherein the second user differs from the first user;

said processor filtering the one or more determined profiles; and said processor providing the one or more filtered profiles to the first user, wherein said providing the one or more filtered profiles to the first user comprises providing to the first user at least five different information items of the second user, and wherein each different information item of the at least five different information items of the second user is selected from the group consisting of a name of the second user, an address of the second user, shift hours of the second user, an office location of the second user, authorizations possessed by the second user, applications that the second user has access to, the second user's title in an organization, the second user's job responsibilities in the organization, a name of the second user's supervisor in the organization, the second user's place in an organizational/reporting structure of the organization, and a term of service of the second user in the organization.

8. The computer program product of claim 7, wherein the organization comprises a plurality of client users, and wherein said filtering is based on organizational positions of the client users within an organizational hierarchy of the organization.

9. The computer program product of claim 7, wherein said receiving the request from the user is a result of the first user having sent the request in response to the second user not having responded to messages displayed at the IP address of the second user.

10. The computer program product of claim 7, wherein the one or more determined profiles comprise group information pertaining to a plurality of groups to which the second user belongs, wherein said providing the one or more filtered profiles to the first user comprises providing the group information to the first user, wherein the plurality of groups include a first group comprising a plurality of users who use a specified application, and wherein the plurality of users comprises the second user.

11. The computer program product of claim 7, wherein the database messaging system comprises a client computer and a server computer connected to each other by a network, wherein the one or more profiles are stored in both a client database at the client computer and a server database at the server computer, wherein the client computer comprises a client communication profile module configured to access the one or more profiles from the client database to provide the accessed one or more profiles to a client user at the client computer, wherein the server computer comprises a server communication profile module configured to access the one or more profiles from the server database to provide the accessed one or more profiles to a server user at the server computer, and wherein the first user is either the client user or the server user.

12. A computer system comprising a processor, a computer readable storage device, and a computer readable memory unit, said computer readable storage device storing program code configured to be executed by the processor to implement, via the memory unit, a method for providing communication profiles in a database messaging system, the method comprising:

receiving, by said processor from a first user of the database messaging system having at least one processing unit and display, a request for one or more profiles;

said processor determining one or more profiles based on the profile request by accessing a profile database, the one or more profiles each including an indication of a second user of the database messaging system and an Internet Protocol (IP) address of the second user, wherein the second user differs from the first user;

said processor filtering the one or more determined profiles; and said processor providing the one or more filtered profiles to the first user, wherein said providing the one or more filtered profiles to the first user comprises providing to the first user at least five different information items of the second user, and wherein each different information item of the at least five different information items of the second user is selected from the group consisting of a name of the second user, an address of the second user, shift hours of the second user, an office location of the second user, authorizations possessed by the second user, applications that the second user has access to, the second user's title in an organization, the second user's job responsibilities in the organization, a name of the second user's supervisor in the organization, the second user's place in an organizational/reporting structure of the organization, and a term of service of the second user in the organization.

13. The computer system of claim 12, wherein the organization comprises a plurality of client users, and wherein said filtering is based on organizational positions of the client users within an organizational hierarchy of the organization.

14. The computer system of claim 12, wherein said receiving the request from the first user is a result of the first user having sent the request in response to the second user not having responded to messages displayed at the IP address of the second user.

15. The computer system of claim 12, wherein the one or more determined profiles comprise group information pertaining to a plurality of groups to which the second user belongs, wherein said providing the one or more filtered profiles to the first user comprises providing the group information to the first user, wherein the plurality of groups include a first group comprising a plurality of users who use a specified application, and wherein the plurality of users comprises the second user.

16. The computer system of claim 12, wherein the database messaging system comprises a client computer and a server computer connected to each other by a network, wherein the one or more profiles are stored in both a client database at the client computer and a server database at the server computer, wherein the client computer comprises a client communication profile module configured to access the one or more profiles from the client database to provide the accessed one or more profiles to a client user at the client computer, wherein the server computer comprises a server communication profile module configured to access the one or more profiles from the server database to provide the accessed one or more profiles to a server user at the server computer, and wherein the first user is either the client user or the server user.

\* \* \* \* \*